(12) United States Patent
Young et al.

(10) Patent No.: US 10,394,233 B2
(45) Date of Patent: Aug. 27, 2019

(54) DUAL-CONTROLLED RIDE-ON VEHICLE

(71) Applicant: Radio Flyer Inc., Chicago, IL (US)

(72) Inventors: Matthew E. Young, Chicago, IL (US); Daniel R. Greenberg, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 53 days.

(21) Appl. No.: 15/598,765

(22) Filed: May 18, 2017

(65) Prior Publication Data

US 2017/0336785 A1 Nov. 23, 2017

Related U.S. Application Data

(60) Provisional application No. 62/339,564, filed on May 20, 2016.

(51) Int. Cl.
*G05D 1/00* (2006.01)
*A63H 30/04* (2006.01)
*B62K 11/00* (2006.01)

(52) U.S. Cl.
CPC ............ *G05D 1/0016* (2013.01); *A63H 30/04* (2013.01); *B62K 11/00* (2013.01); *G05D 1/0033* (2013.01); *G05D 2201/0214* (2013.01)

(58) Field of Classification Search
CPC .............. G05D 1/0016; G05D 1/0033; G05D 2201/0214; B62K 11/00; A63H 30/04
USPC .................... 340/467; 318/445, 466, 549; 180/167–170

See application file for complete search history.

(56) References Cited

U.S. PATENT DOCUMENTS

| 3,213,417 | A | 10/1965 | Lewus |
| 4,088,852 | A | 5/1978 | VanDoren |
| 4,772,765 | A | 9/1988 | Markle |
| 5,764,009 | A | 6/1998 | Fukaya et al. |
| 5,816,352 | A | 10/1998 | Hacker |

(Continued)

FOREIGN PATENT DOCUMENTS

FR 2912929 8/2008

OTHER PUBLICATIONS

International Search Report and Written Opinion for related International Patent Application No. PCT/US17/17328, dated Apr. 13, 2017.

(Continued)

*Primary Examiner* — Nga X Nguyen
(74) *Attorney, Agent, or Firm* — Barnes and Thornburg LLP

(57) ABSTRACT

A ride-on vehicle is provided that has optional remote control capabilities. The ride-on vehicle comprises front and rear wheels, a steering wheel, a steering motor, a drive motor, an accelerator, a parent override switch and a main controller for controlling the drive motor and the steering motor based on input signals. A remote control is also provided to send signals to the main controller. The main controller provides for three modes of operation of the ride-on vehicle, including a child only drive mode, a partial child and partial remote drive mode, and a full remote drive mode, and wherein the main controller switches between the three modes of operation in real time based on signals received from the remote control and the parent override switch.

23 Claims, 8 Drawing Sheets

(56) References Cited

U.S. PATENT DOCUMENTS

| | | |
|---|---|---|
| 7,222,684 B2 * | 5/2007 | Norman .................. B62K 9/00 |
| | | 180/65.1 |
| 7,344,430 B2 | 3/2008 | Hasty et al. |
| 7,438,148 B1 | 10/2008 | Crea |
| 8,072,309 B2 | 12/2011 | Kraimer et al. |
| 2003/0174085 A1 * | 9/2003 | Gavish .................. A63G 25/00 |
| | | 341/176 |
| 2007/0034433 A1 | 2/2007 | Gabriele |
| 2009/0139785 A1 | 6/2009 | Hoogenraad |
| 2009/0174363 A1 | 7/2009 | Maher |
| 2011/0258838 A1 | 10/2011 | McCabe et al. |
| 2013/0337669 A1 | 12/2013 | Najera et al. |

OTHER PUBLICATIONS

International Search Report and Written Opinion for related International Patent Application No. PCT/US17/17336, dated Apr. 14, 2017.

International Search Report and Written Opinion for related International Patent Application No. PCT/US17/17333, dated Jun. 12, 2017.

International Search Report and Written Opinion for related International Patent Application No. PCT/US17/33476, dated Aug. 4, 2017.

* cited by examiner

|  | PARENT OVERRIDE SWITCH 122 | |
|---|---|---|
| REMOTE SWITCH 63 | ON 124 | OFF 126 |
| ON 128 | OVERRIDE CAPABLE 132 | KID MODE ONLY 134 |
| OFF / BAD SIGNAL 130 | CAR DOES NOT MOVE 136 | KID MODE ONLY 138 |

FIG. 10

DUAL-CONTROLLED RIDE-ON VEHICLE

CROSS-REFERENCE TO RELATED APPLICATIONS

This application claims the benefit of U.S. Provisional Patent Application No. 62/339,564, filed May 20, 2016, which is expressly incorporated herein by reference and made a part hereof.

FEDERALLY SPONSORED RESEARCH OR DEVELOPMENT

Not Applicable.

TECHNICAL FIELD

The present disclosure generally relates to a powered vehicle, and in particular, to a battery-powered ride-on vehicle with dual on-board drive and remote-control drive capabilities.

BACKGROUND

Ride-on vehicles, including remote-controlled ride-on vehicles, are known, as are battery powered vehicles. However, standard battery powered and remote-controlled ride-on vehicles have numerous deficiencies and limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a ride-on vehicle that has dual remote control or selective remote-control capabilities.

The disclosed technology further relates to a dual-controlled powered ride-on vehicle comprising: a frame supported by front wheels and rear wheels, the front wheels provided for turning the ride-on vehicle, and the rear wheels provided for propelling the ride-on vehicle; a steering wheel operably connected to the front wheels; a steering motor operably connected to the front wheels; a drive motor connected to at least one of the rear wheels, the drive motor operable in a forward direction and a reverse direction; an accelerator; a parent override switch; a main controller electrically connected to the drive motor, the steering motor, the accelerator, and the parent override switch, the main controller receiving signals from the accelerator and the parent override switch, and the main controller sending signals to the drive motor and the steering motor; a transceiver electrically connected to the main controller; a remote control having an input member, a controller and a transceiver for transmitting and receiving signals to and from the transceiver electrically connected to the main controller; and, wherein the main controller provides for three modes of operation of the ride-on vehicle, including a child only drive mode, a partial child and partial remote drive mode, and a full remote drive mode, and wherein the main controller switches between the three modes of operation in real time based on signals received from the remote control and the parent override switch.

The disclosed subject technology further relates to a dual-controlled powered ride-on vehicle comprising: a frame supported by wheels for turning the vehicle and wheels for propelling the vehicle; a steering wheel operably connected to the wheels for turning the vehicle; a steering motor operably connected to the wheels for turning the vehicle; a drive motor connected to at least one of the wheels for propelling the vehicle, the drive motor operable in a forward direction and a reverse direction; an accelerator; a parent override switch; a main controller electrically connected to the drive motor, the steering motor, the accelerator, and the parent override switch, the main controller operably receiving signals from the accelerator and the parent override switch, and the main controller operably sending signals to the drive motor and the steering motor; a remote control having an input member, a controller and a transmitter for operably transmitting signals to the main controller; and, wherein the main controller provides for the accelerator to operably provide an input signal to the drive motor for propelling the vehicle and the steering wheel to operably control the wheels for turning the vehicle when the parent override switch is in a first position, and wherein the main controller provides for the accelerator to operably provide an input signal to the drive motor and the steering wheel to operably control the wheels for turning the vehicle when the parent override switch is in a second position and the input member of the remote control is in a neutral position.

The disclosed subject technology further relates to a dual-controlled powered ride-on vehicle, comprising: a frame supported by wheels for turning the vehicle and wheels for propelling the vehicle; a steering wheel operably connected to the wheels for turning the vehicle; a steering motor operably connected to the wheels for turning the vehicle; a drive motor connected to at least one of the wheels for propelling the vehicle, the drive motor operable in a forward direction and a reverse direction; an accelerator; a parent override switch; a main controller electrically connected to the drive motor, the steering motor, the accelerator, and the parent override switch, the main controller operably receiving signals from the accelerator and the parent override switch, and the main controller operably sending signals to the drive motor and the steering motor; a remote control having an input member, a controller and a transmitter for operably transmitting signals to the main controller; and, wherein the main controller provides for the accelerator to operably provide an input signal to the drive motor for propelling the vehicle and the steering wheel to operably control the wheels for turning the vehicle when the parent override switch is in a first position, wherein when the parent override switch is in a second position and the input member is maintained within a specific distance from a Y-axis in a positive Y direction and a negative Y direction, and wherein the input member is transitioned a distance from an X-axis in either the positive X direction or the negative X direction, the accelerator will control the speed of the vehicle and the input member of the remote control will control steering of the vehicle.

The disclosed subject technology further relates to a dual-controlled powered ride-on vehicle wherein when the parent override switch is in the off position the main controller operates in child only drive mode, and signals from the remote control do not control operation of the vehicle. In one embodiment, when the parent override switch is in the on position and the input member is providing a neutral zone signal, the controller operates the vehicle in the child only mode. Further, when the parent override switch is in the on position and the input member is providing a signal other than a neutral zone signal, the controller operates the vehicle in either the partial remote drive mode or the full remote drive mode depending on a signal from the input member of the remote control.

The disclosed subject technology further relates to a dual-controlled powered ride-on vehicle wherein when the vehicle is in partial drive mode the accelerator controls the speed of the vehicle and the input member of the remote control controls the direction of the vehicle but not the speed. In one embodiment, the vehicle is in the partial drive mode when the input member is maintained within a specific distance from a Y-axis in a positive Y direction and a negative Y direction, and when the input member is transitioned a distance from an X-axis in either the positive X direction or the negative X direction.

The disclosed subject technology further relates to a dual-controlled powered ride-on vehicle wherein when the vehicle is in the full remote drive mode the steering wheel does not control movement of the front wheels and the accelerator does not control movement of the rear wheels, and wherein movement of the front wheels and movement of the rear wheels is controlled by a signal from the input member of the remote control. In one embodiment the vehicle is in the full remote drive mode when the input member is transitioned a sufficient distance in a positive Y direction or a negative Y direction from a Y-axis.

The disclosed subject technology further relates to a dual-controlled powered ride-on vehicle wherein the remote control further has an emergency stop button, and wherein when the emergency stop button is engaged the drive motor is transitioned to stop.

The disclosed subject technology further relates to a dual-controlled powered ride-on vehicle wherein the vehicle will not operate when the parent override switch is in an override setting and when the remote control is off In one embodiment, the vehicle will not operate when the parent override switch is in an override setting and when the transceiver electrically connected to the main controller is not receiving a satisfactory signal from the remote control.

The disclosed subject technology further relates to a dual-controlled powered ride-on vehicle having a forward-reverse switch, wherein the forward-reverse switch sends a signal to the controller to set a rotation direction of the drive motor when the drive motor is controlled by the accelerator, and wherein the signal from the forward-reverse switch can be overridden by a signal from the remote control.

The disclosed subject technology further relates to a dual-controlled powered ride-on vehicle having a signal light on the remote control to provide an indication of a strength of the signal between the transceiver in the remote control and the transceiver electrically coupled to the main controller. In one embodiment, the signal light on the remote control provides a low battery indication.

The disclosed subject technology further relates to a dual-controlled powered ride-on vehicle, wherein the main controller provides for the steering wheel not to control turning of the vehicle when the parent override switch is in the second position and the input member of the remote control is maintained within a specific distance from a Y-axis in a positive Y direction and a negative Y direction, and when the input member is transitioned a distance from an X-axis in either the positive X direction or the negative X direction.

The disclosed subject technology further relates to a dual-controlled powered ride-on vehicle, wherein the main controller provides the accelerator not to control the drive motor and for the steering wheel not to control turning of the vehicle when the parent override switch is in the second position and the input member of the remote control is transitioned further than a set distance from a Y-axis in a positive Y direction or a set distance from the Y-axis in the negative Y direction.

The disclosed subject technology further relates to a dual-controlled powered ride-on vehicle comprising a forward-reverse switch in the vehicle, the vehicle moving in the forward direction when the forward-reverse switch is positioned in the forward position and the accelerator is depressed, and the vehicle moving in the reverse direction when the forward-reverse switch is positioned in the reverse position and the accelerator is depressed.

The disclosed subject technology further relates to a dual-controlled powered ride-on vehicle, wherein when the parent override switch is in the second position, the forward-reverse switch in the vehicle is in the forward position, the accelerator is depressed, and the remote control is on, when the input member of the remote control is moved a sufficient distance in the negative Y direction, the controller will cause the vehicle to slow down to zero, pause, and then then transition to the reverse direction.

The disclosed subject technology further relates to a dual-controlled powered ride-on vehicle comprising an emergency stop button on the remote control, the emergency stop button overriding the accelerator and the input member of the remote control, and causing the drive motor to transition to zero velocity when depressed.

The disclosed subject technology further relates to a dual-controlled powered ride-on vehicle, wherein when the input member is transitioned a sufficient distance in a positive Y direction or a negative Y direction from a Y-axis the input member will control the drive motor.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

FIG. 10 is a schematic showing one embodiment of drive logic for a dual-controlled battery-powered vehicle.

DETAILED DESCRIPTION

Figure 1:
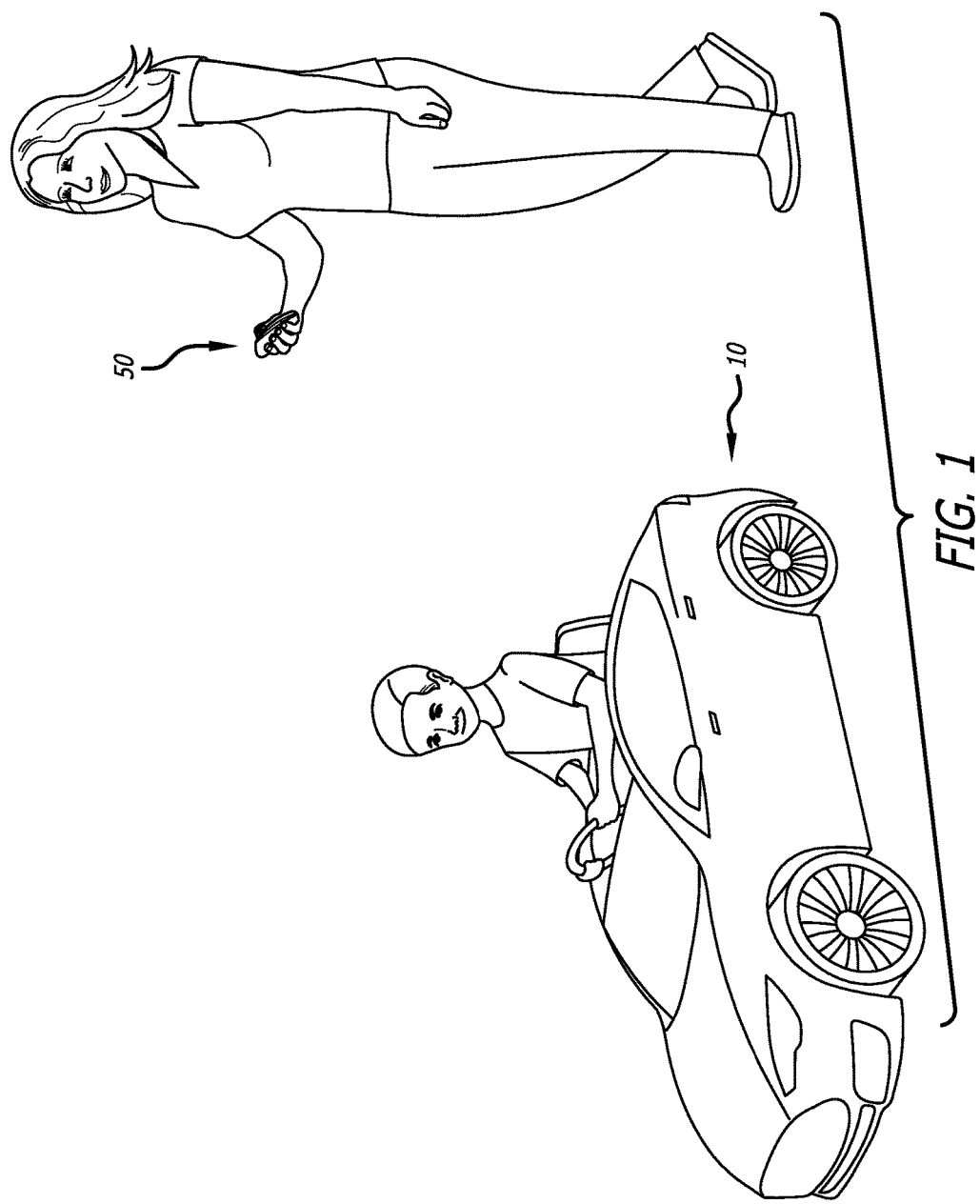
FIG. 1 is a front perspective view of a dual-controlled battery-powered vehicle and remote FOB according to one embodiment.
Figure 2:
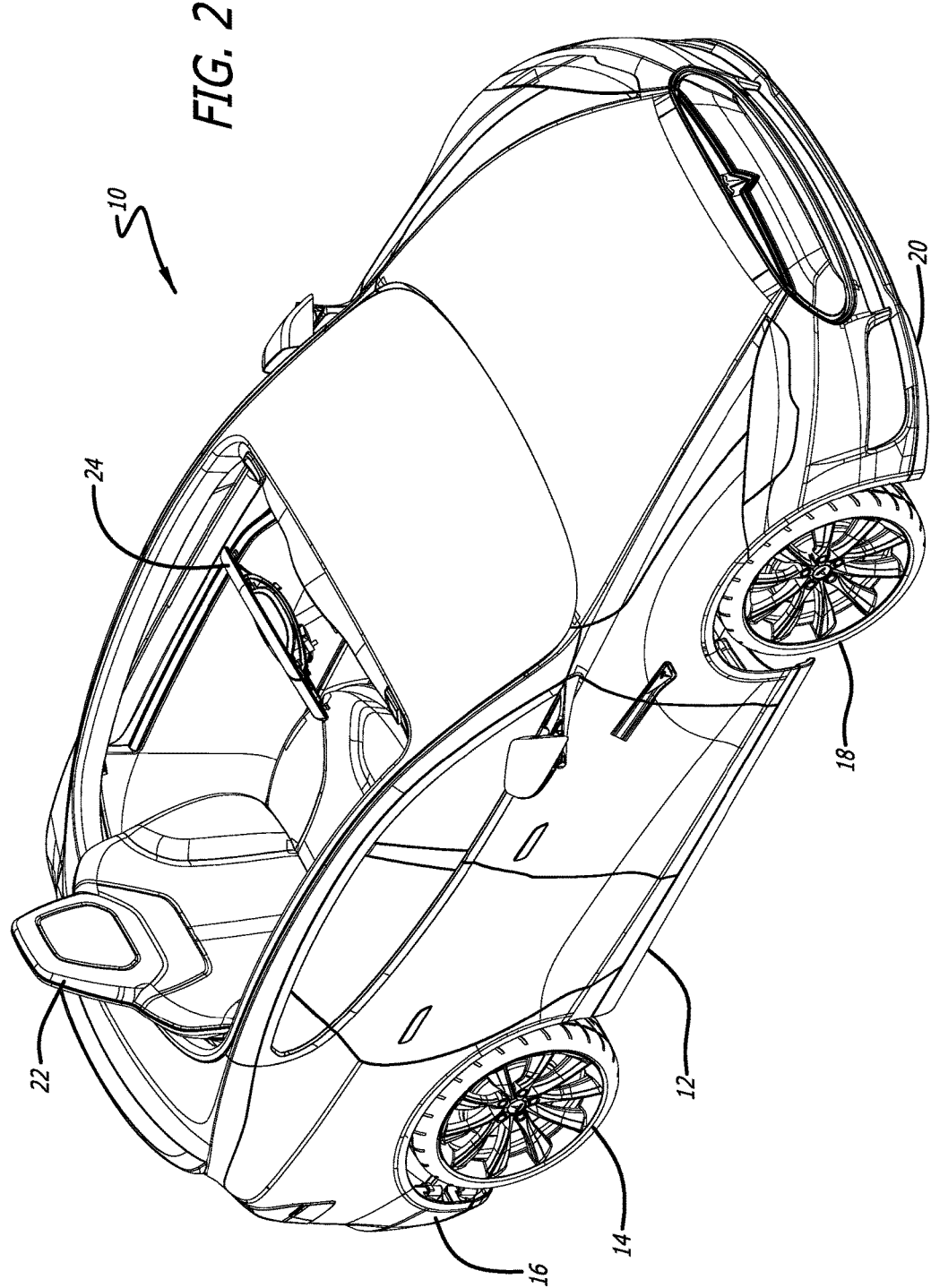
FIG. 2 is a front perspective view of the dual-controlled battery-powered vehicle of FIG. 1 according to one embodiment.

While the dual-controlled powered vehicle discussed herein is susceptible of embodiments in many different forms, there is shown in the drawings, and will herein be described in detail, preferred embodiments with the understanding that the present description is to be considered as an exemplification of the principles of the dual-controlled powered vehicle and is not intended to limit the broad aspects of the disclosure to the embodiments illustrated.

Figure 3:
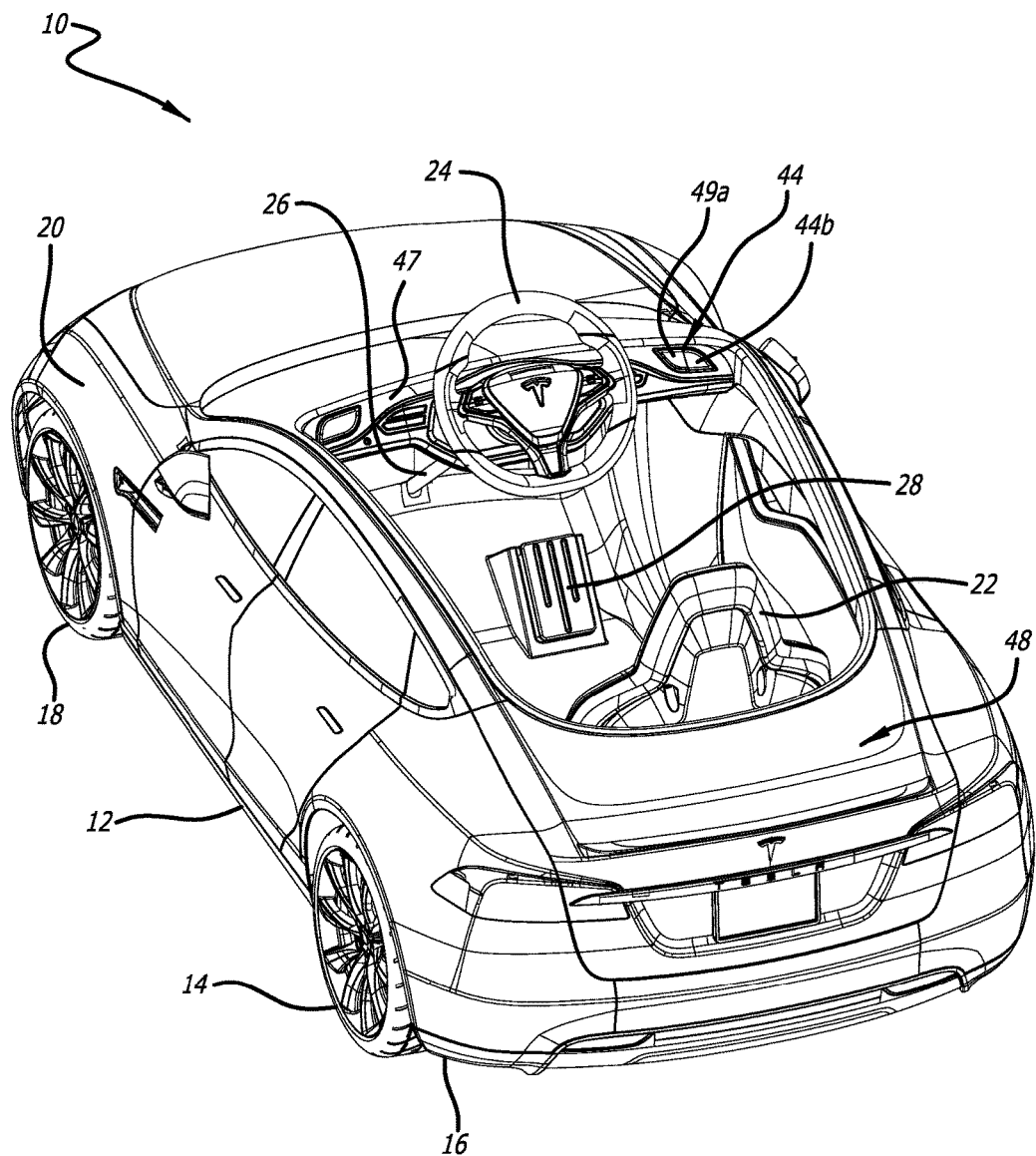
FIG. 3 is a rear perspective view of the dual-controlled battery-powered vehicle of FIG. 1.
Figure 4:
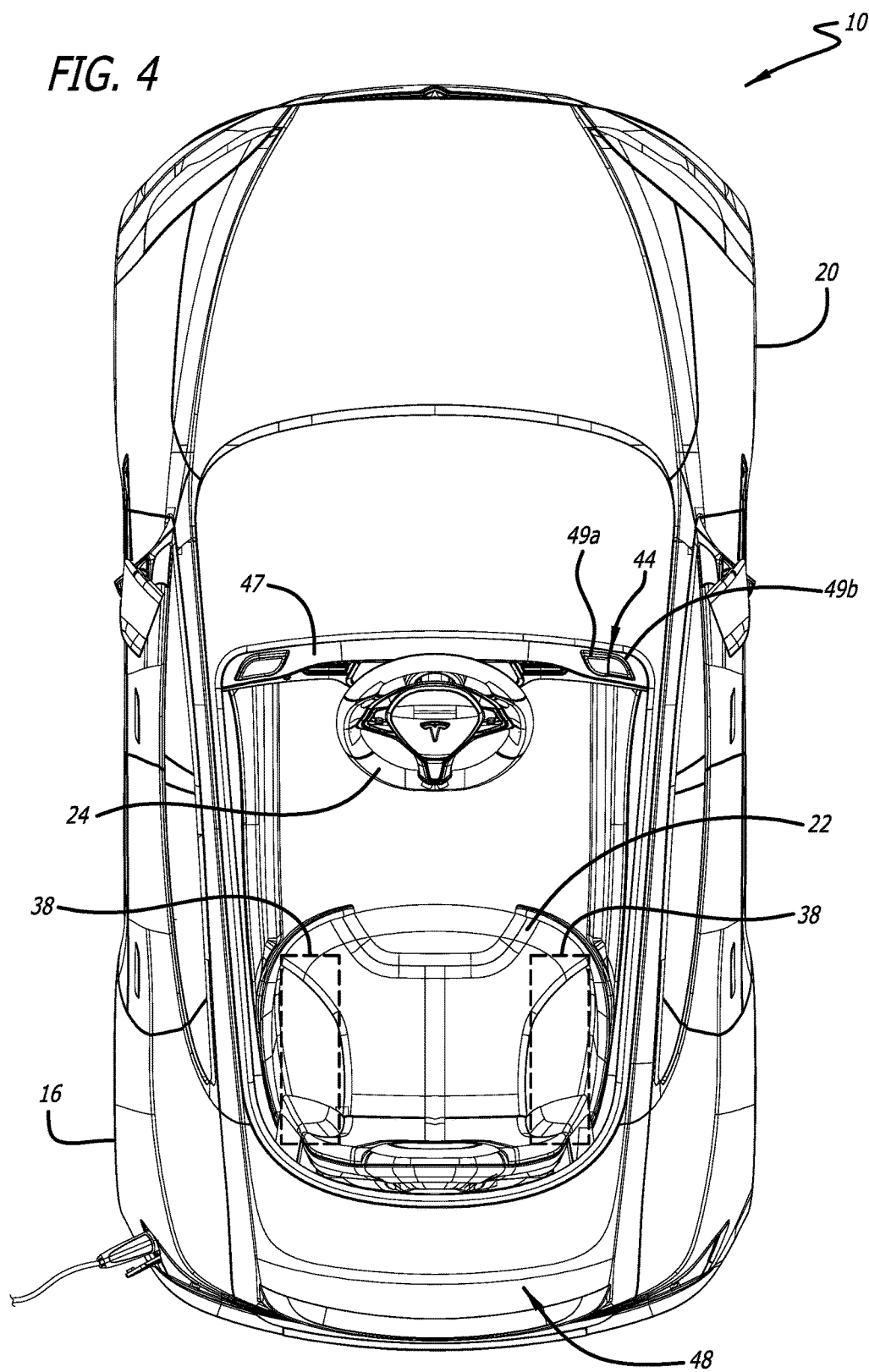
FIG. 4 is a top view of the dual-controlled battery-powered vehicle of FIG. 1.

The dual-controlled powered vehicle is a ride-on vehicle that is preferably used by children and adolescents, but in alternate embodiments may be used by larger individuals, such as adults. Referring now to FIGS. 1-4, one embodiment of the dual-controlled powered vehicle 10 is shown. The powered vehicle 10 may include a frame 12 supported by a pair of rear wheels 14 at the rearward portion 16 of the frame 12, and a pair of front wheels 18 at the forward portion 20 of the frame 12. The vehicle 10 also preferably includes a seat 22 to support the rider, a steering wheel 24 operably connected to the front wheels 18 via a steering column 26 to assist in steering the vehicle 10, an accelerator 28, and one or more motors 38. Alternately, the steering wheel 24 may be electronically coupled to the front wheels 18. In such an embodiment no steering column 26 is needed. For example, a motor, such as a servo motor 78 may be connected to a linkage (not shown) that is able to turn the front wheels 18. The steering wheel 24 may be connected to electronics that send a signal to a controller 52, which is able to control the motor 78 for adjusting the front wheels 18 based on the signal received from the steering wheel 24 for turning the vehicle 10. For example, a potentiometer may be used in connection with the steering wheel 24 to create a signal that is sent to the controller 52. In a preferred embodiment a pair of motors 38 is provided to drive the rear wheels 14 for propelling the vehicle 10. A first motor 38 is provided for the one of the rear wheels 14 and a second motor 38 is provided for the other of the rear wheels 14. Alternately, only one motor may be used and it may be connected to one or both rear wheels. In one embodiment, the rear drive motors 38 may be connected to the frame 12 and underneath the seat 22, as shown in FIG. 4. A main controller 52, shown in FIG. 7, may be provided to control all aspects of the drive system 70 as described herein.

As explained herein, in various modes, when the vehicle is battery powered and when the user depresses the accelerator 28, a battery pack 40, which may be a series of rechargeable battery cells, supplies current to the motors 38 to have the motor(s) 38 rotate the rear wheels 14 to drive the vehicle 10. As further discussed herein as well, the vehicle 10 may be driven in both the forward mode to propel the vehicle 10 forward, and in the reverse mode to propel the vehicle 10 backwards. Additionally, as discussed further herein, the vehicle 10 may be controlled remotely in one or more aspects: forward and reverse direction, forward and reverse speed, and left/right turning by FOB 50 or some other remote control device 50.

Figure 7:
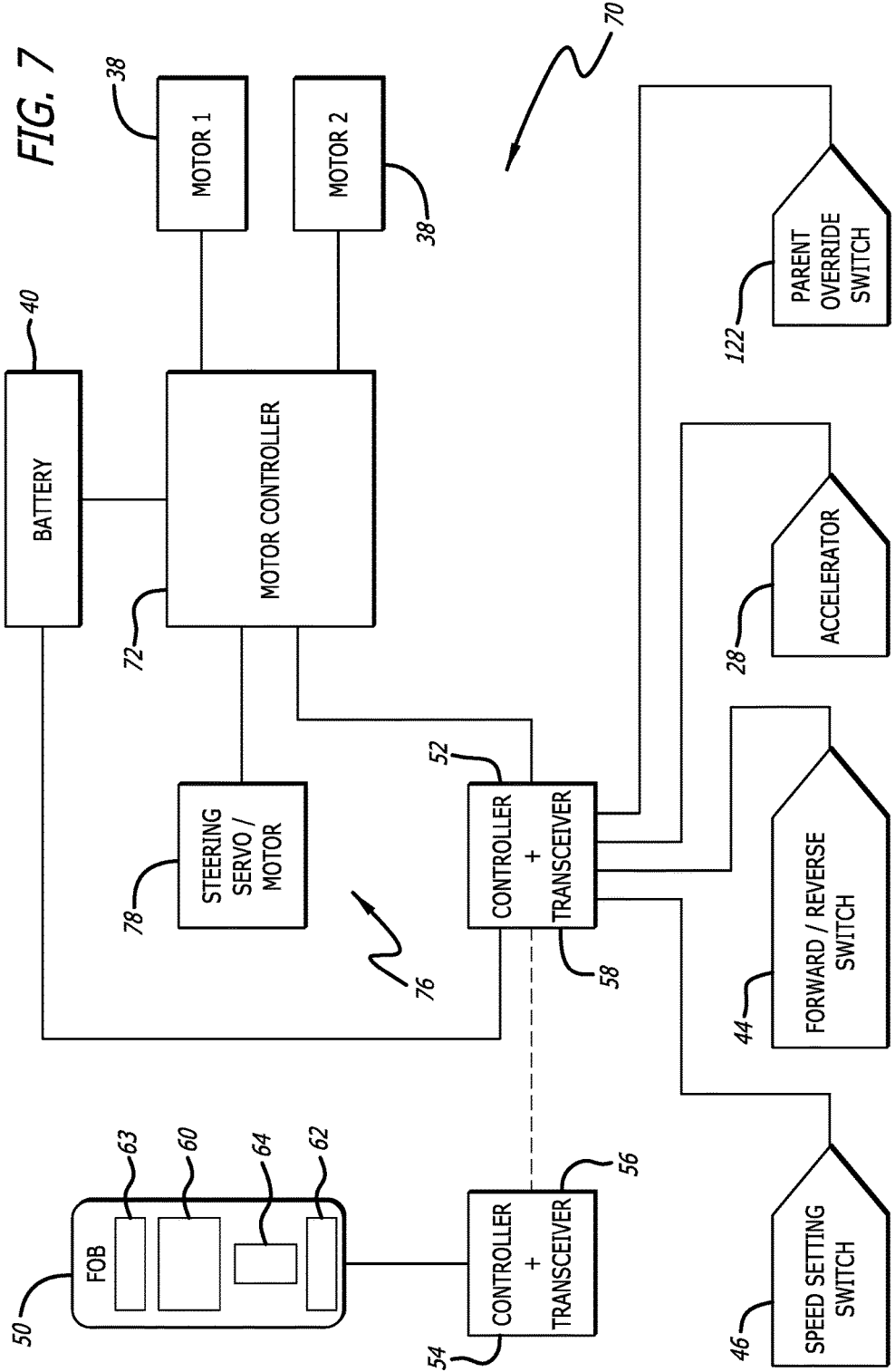
FIG. 7 is a schematic showing one embodiment of a drive system configuration for a dual-controlled battery-powered vehicle.

In various embodiments the vehicle 10 may be driven in the forward mode to propel the vehicle 10 forward, and in the reverse mode to propel the vehicle 10 backwards. In one embodiment, to assist in controlling whether the vehicle 10 is able to move in the forward mode or in the reverse mode and to determine how fast the vehicle 10 may traverse, the vehicle 10 may have a forward/reverse switching system, as shown in FIGS. 3, 4 and 7. Referring to these figures, in one embodiment the forward/reverse switching system may comprise one or more of a forward/reverse switch assembly 44, a speed control switch assembly 46, the battery pack 40 and the motors 38, all of which are electronically connected to the main controller 52, which controls the drive logic for all components. In one embodiment the forward/reverse switch assembly 44 includes, among other components described below, a toggle switch with two positions, a forward position and a reverse position. Similarly, in one embodiment the speed control switch assembly 46 includes a toggle switch with two positions, a high speed position and a low speed position, however, additional or less speed settings may be provided. One embodiment of the forward/reverse switch assembly 44 is shown in FIG. 3. As shown, the forward/reverse switch assembly 44 may comprise a forward button 49a and a reverse button 49b.

The vehicle 10 may preferably be operated in a high speed mode and a low speed mode, however, it is understood that rather than merely a high speed mode and a low speed mode the vehicle 10 may operate in a plurality of different speed modes. In the preferred embodiment, in the high speed mode the vehicle 10 will have a top speed of X, and in the low speed mode the vehicle 10 will have a top speed of Y, where Y is less than X. In various embodiments, the controller 52 of the vehicle 10 may allow for variable speed, i.e., from zero to the highest speed allowed in each mode depending on how much force is applied to the accelerator 28 or the location of the input member 60 on the FOB 50 (see FIG. 9), or for non-variable speed, i.e., when the accelerator 28 is depressed, or the input member 60 on the FOB 50 is appropriately manipulated (see FIG. 8), the motors 38 will be set to the top speed of each speed mode. In one embodiment the vehicle may be configured not to allow operation of the vehicle 10 in the high speed mode when the vehicle 10 is in the reverse mode. Accordingly, in that embodiment the vehicle 10 may be operated in the high speed or the low speed when in the forward mode, but only in the low speed when in the reverse mode. Preferably, the vehicle automatically defaults to the low speed mode via internal controls when the vehicle 10 is put into the reverse mode. In one embodiment, when the vehicle 10 is in the high speed mode the vehicle 10 provides approximately 14.4 volts from the battery pack 40 to each motor 38, but when the vehicle 10 is in the low speed mode the vehicle 10 only provides approximately 7.2 volts from the battery pack 40 to each motor 38 to reduce the operating speed of each motor 38 in the low speed mode. When variable drive is available, such as shown in FIG. 9, the main controller 52 may control the amount of voltage that is supplied to each motor 38 based on, for example, the force applied to the accelerator 28 or the amount of movement of the input member 60 of FOB 50, or the controller may directly control the motors 38 to adjust the output of the motors 38.

In one embodiment the forward/reverse switch assembly 44 and the speed control switch assembly 46 are provided in separate locations on the vehicle 10. For example, as shown in FIGS. 3 and 4, the forward/reverse switch assembly 44 may be provided in the dashboard or instrument panel 47 of the vehicle 10. Similarly, in one embodiment the speed control switch assembly 46 may be provided at a separate location from the forward/reverse switch assembly 44, such as the trunk 48 of the vehicle 10. In such a configuration, the user is able to readily control whether the vehicle 10 is in the forward mode or the reverse mode by operating the forward/reverse switch assembly 44 located in the dashboard 47 of the vehicle 10, while a parent or other supervisor is able to control whether the vehicle 10 is in the high speed or the low speed because the speed control switch assembly 46 is in the trunk 48 of the vehicle 10 and is not accessible by a rider seated in the seat 22 of the vehicle 10.

In one embodiment, as shown in FIGS. 1 and 5-7, the dual-controlled battery-powered vehicle 10 may have a controller or FOB 50 associated therewith. In one embodiment, the FOB 50 is a device that communicates, preferably wirelessly, with the main controller 52 in the vehicle 10. In a preferred embodiment, the FOB 50 includes both a microcontroller 54 and a transceiver 56. The transceiver 56 is preferably an electrical device that can both transmit and receive data to/from the main controller 52 in the vehicle 10. Alternately, separate transmitters and receivers, as necessary, may be provided. Similarly, the main controller 52 in the vehicle 10 preferably has a transceiver 58 associated therewith to transmit and receive data to/from the microcontroller 54 in the FOB 50. In different embodiments the transceivers 56, 58 transmit and receive data via various wireless technologies, such as radio frequency (i.e., RF), Bluetooth, Wi-Fi, etc. Because, in one embodiment, the controller 52 has a transceiver 56 associated therewith, the vehicle 10 may be capable of receiving various items wirelessly such as software updates. Additionally, the user may be able to stream music wirelessly to the sound system for the vehicle 10. The FOB 50 may be a separate device, such as a separate remote controller 50 shown in FIGS. 1, 5 and 6, or it may be integrated within other electronic devices, such as a smartphone, tablet, PDA, or other computing device. Additionally, a downloadable application may be included to provide FOB functionality to any appropriate electronic device.

Figure 5:
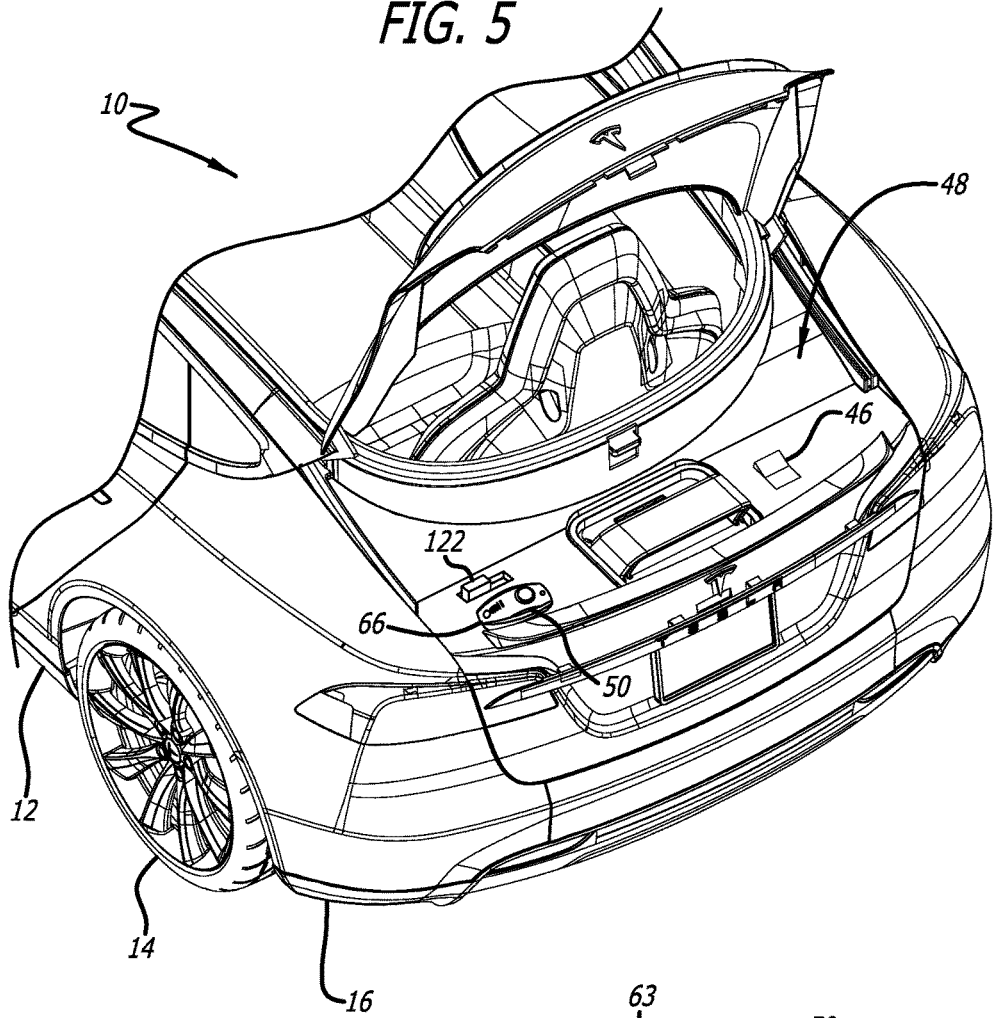
FIG. 5 is a rear perspective view of the dual-controlled battery-powered vehicle with the trunk open to show one embodiment of a FOB for the battery-powered vehicle.
Figure 6:
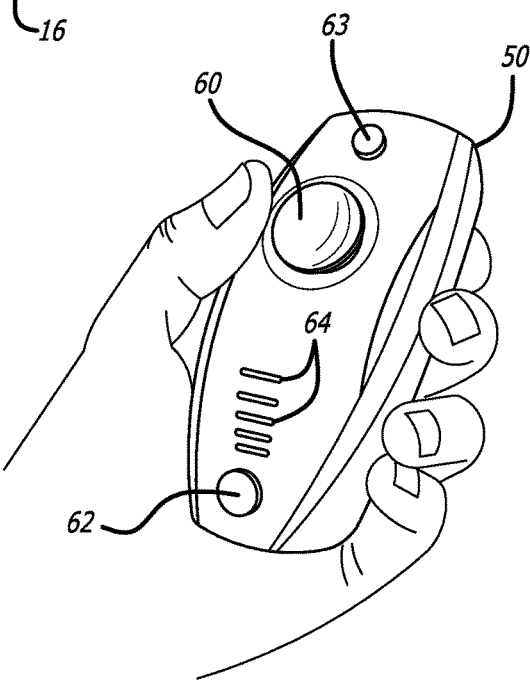
FIG. 6 is a perspective view of one embodiment of a FOB for a battery-powered vehicle.

Referring to FIGS. 1, 5 and 6, in one embodiment the FOB 50 contains an input member 60, which in one embodiment is a joystick 60 that is used to control the turning of the vehicle 10, the speed of the vehicle 10 and the direction (i.e., forward and reverse) of the vehicle 10. While a joystick 60 is described with respect to the preferred embodiment, alternate components of the remote controller 50, including but not limited to a virtual joystick, a smart device, such as a smart phone, including those with motion sensors and/or a gyroscope, a keypad with up/down and left/right arrows, etc., may provide appropriate inputs/signals. In a preferred embodiment, the FOB 50 also contains an emergency stop button 62. The FOB 50 may also have an emergency stop/brake button or switch 62, an on/off button or switch 63, and one or more indicator lights 64. The indicator lights 64 may provide various information, such as battery life of the FOB 50, battery life of the battery pack 40 in the vehicle 10, an indication of whether the FOB 50 is in the process of being paired or is paired with the controller 52 in the vehicle 10, an indication that the signal between the FOB 50 and the controller 52 is strong or weak, an indication that the emergency stop button has been depressed and the emergency brake of the vehicle 10 is engaged (i.e., the motors 38 are in a brake or non-rotation mode), etc. For example, in one embodiment, the indicator light 64 may be a plurality of different colored LED lights. Alternately, the indicator light 64 may be a single multi-colored LED. In alternate embodiments the indicator light 64 may take different configurations. In one embodiment, the indicator light 64 displays a solid blue color when the FOB 50 is paired and is transmitting/receiving a full or strong signal with the transceiver 58 for the controller 52. In another embodiment, the indicator light 64 displays a flashing blue color when the FOB 50 is either not paired or is transmitting/receiving a weak signal with the transceiver 58 for the controller 52. In another embodiment, the indicator light 64 displays a flashing red and blue light when the pairing process is being conducted. In another embodiment, the indicator light 64 displays a solid red light when the emergency stop button 62 has been depressed and the emergency brake is on. In another embodiment, the indicator light 64 displays a flashing red light when the battery of the FOB 50 is low. In an alternate embodiment the indicator lights 64 of the FOB 50 may also indicate certain features regarding the signal between the FOB 50 and the control system 70 for the vehicle 10. The indicator lights 64 of the FOB 50 may also indicate, such as with a light, when a button of the FOB 50 has been depressed to provide feedback to the user that a signal has been sent to the vehicle 10. The vehicle 10 may have a storage receiver 66 for storing the FOB 50, such as in the trunk 48 of the vehicle 10.

Referring to FIG. 7, one embodiment of a drive system for a dual-controlled battery-powered vehicle 10 is illustrated. The control system 70 for the dual-powered battery-operated vehicle comprises various components found in the child only drive version of the battery-powered vehicle 10, as well as components to provide for remote drive and the controls associated with the remote drive. For example, in one embodiment the control system 70 comprises a motor controller 72, a first motor 38 for one rear wheel 14, a second motor 38 for the other rear wheel 14, a battery pack 40, a forward/reverse switch assembly 44, a speed control switch assembly 46, an accelerator 28, and a main controller 52 electronically controlling and linking all aspects of the control system 70. In an alternate embodiment wherein the steering wheel 24 is not mechanically connected to the front wheels 18 and is rather electronically connected to the front wheels 18, a steering motor 78 may be provided as part of the control system 70. In different embodiments, the steering motor 78 may have its own controller or a separate micro controller may be provided for the steering motor 78 to receive and/or transmit signals with the main controller 52. Alternately, the steering motor 78 may provide an absolute signal of the position of the motor gearing, such as with a potentiometer, encoder, sensor, etc. so that the controller 62 will know the direction of the vehicle for adjusting based on further input from either the steering wheel 24 or the FOB 50.

For the dual-controlled battery-powered vehicle 10, the control system 70 preferably also includes a transceiver 58 electrically connected to the controller 52, a steering system 76 controlled by the main controller 52, and a FOB 50 that has both a microcontroller 54 and a transceiver 56 to send and receive signals from the main controller 52. The steering system 76 includes a steering motor 78 or servo 78 that is controlled by the main controller 52. The steering motor 78 is operatively connected to the front wheels 18 to be able to control the turning of the front wheels 18. In one embodiment there is provided gearing (not shown) connecting the steering motor 78 to either the steering column 26 to be able to control the turning of the front wheels 18, or, if no steering column 26 is provided, to additional gearing or linkages connected to the front wheels 18. In alternate embodiments the steering motor 78 will be connected to a cross member (not shown) connecting the front wheels 18. Further alternate embodiments to operatively connect the steering motor 78 to the front wheels 18 to control turning of the front wheels 18 are within the scope of this disclosure. If the steering system 76 is controlled by a motor as opposed to a servo, the steering motor 78 may receive its signal from a motor controller, such as motor controller 72. In such instance, the motor controller 72 may have channel for both rear motors 38 and one channel for the steering motor 78.

The dual-controlled battery-powered vehicle 10 can preferably be operated in one of four different modes: (1) full child drive mode; (2) partial child/partial remote drive mode; (3) full remote drive mode; and, (4) emergency stop mode. In one embodiment, the vehicle 10 is placed in one of the above-listed modes depending on the location of the input member 60 of the remote controller FOB 50. Alternately, however, the mode may be selected by a switch (not shown) on the FOB 50 or the vehicle 10. For example, the vehicle 10 may include a parent override switch 122, also referred to as a parent lock-out switch 122, as shown in FIG. 5. In one embodiment the parent override switch 122 may be provided in the trunk 48 of the vehicle 10. In one embodiment, the parent override switch 122 is electrically connected to the main controller 52, and in a preferred embodiment the parent override switch 122 has two positions, such as an "on" position and an "off" position.

As shown in FIG. 10, the parent override switch 122 may be in either the "on" position 124 or "off" position 126. Further, the remote control 50 may similarly be in either the "on" position 128 or the "off" position 130. When the parent override switch 122 is in the "on" position 124 the vehicle 10 is adapted to have the remote control 50 provide controls for the vehicle 10, provided the remote control 50 is similarly "on" and further provided the signal between the remote control 50 and the main controller 52 is sufficient. Referring to FIG. 10, when the parent override switch 122 is in the "off" position 126, the vehicle 10 will always be in full child drive mode, also referred to as kid only mode. This means that the remote control 50 will have no effect on either the steering, propulsion or direction (i.e., forward or reverse) of the vehicle 10, and the driver of the vehicle 10 will have full control of the vehicle 10. Accordingly, when the parent override switch 122 on the vehicle 10 is in the "off" position 126, the vehicle 10 will be in full child drive mode, as shown in blocks 134 and 138 of FIG. 10, regardless of whether the remote control 50 is in the "on" position 128 or the "off" position 130. In certain embodiments, if the signal strength between the remote control 50 and the transceiver 58 for the main controller 52 of the vehicle 10 is poor, the control system 70 of the vehicle 10 may treat the remote control 50 as being in the "off" position 130. When the parent override switch 122 is in the "on" position 124, the vehicle 10 will be controlled differently depending on whether the remote control 50 is switched "on" 128 or switched "off" 130. As explained above, in one embodiment, the control system 70 operates as if the remote control 50 is in the "off" position 130 when the signal between the remote control 50 and the vehicle transceiver 58 is below a certain threshold. Further, in one embodiment the on/off switch 63 on the remote control 50 is typically used to place the remote control 50 in either the "on" position 128 or "off" position 130. Referring to FIG. 10, when the parent override switch 124 is in the "on" position 124 and the switch 63 for the remote control 50 is in the "on" position 128 and the signal between the remote control 50 and the vehicle 50 is sufficient, the control system 70 of the vehicle 50 is referred to as being in the override capable mode 132. In the override capable mode 132, the vehicle 50 can be in full child mode if the remote 50 is not being used or if the input member 60, as explained below, is in the neutral position 90; it can be in the partial child/partial remote drive mode if the input member 60 is in the Y-neutral zone 94, as explained below; or, the vehicle 50 can be in the full remote drive mode meaning that the remote control 50 will fully control the vehicle 50. Finally, if the parent override switch 122 is in the "on" position 124 and the remote control 50 is "off", i.e., the switch 63 of the remote control 50 is in the "off" position 130, the vehicle control system 70 will prevent the vehicle 50 from moving and the controller 50 will send a signal to the motor controller 72 to retain the motors 38 stopped. Similarly, if the parent override switch 122 is in the "on" position 124 and the remote control 50 is "on", i.e., the switch 63 of the remote control 50 is in the "on" position, but the transceiver 58 in the vehicle 50 is receiving either no signal or a very poor signal from the remote control 50, which corresponds to block 130 in FIG. 10, the vehicle control system 70 will similarly prevent the vehicle 50 from moving and the controller 50 will send a signal to the motor controller 72 to retain the motors 38 stopped.

Figure 8:
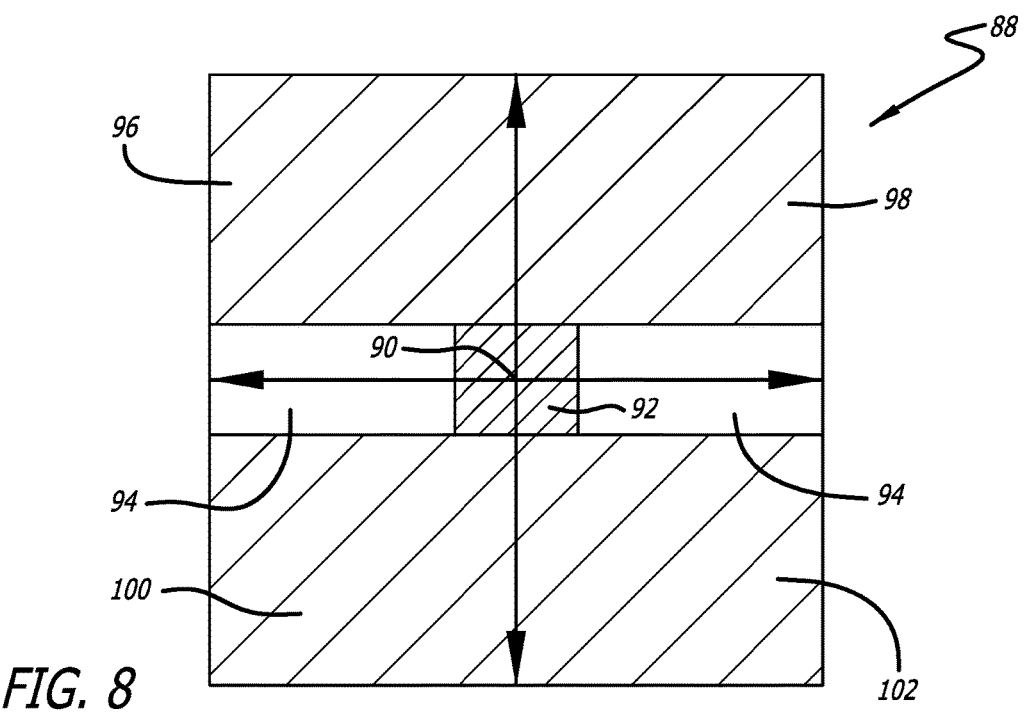
FIG. 8 is a schematic showing the logic for one embodiment of a FOB for a dual-controlled battery-powered vehicle.
Figure 9:
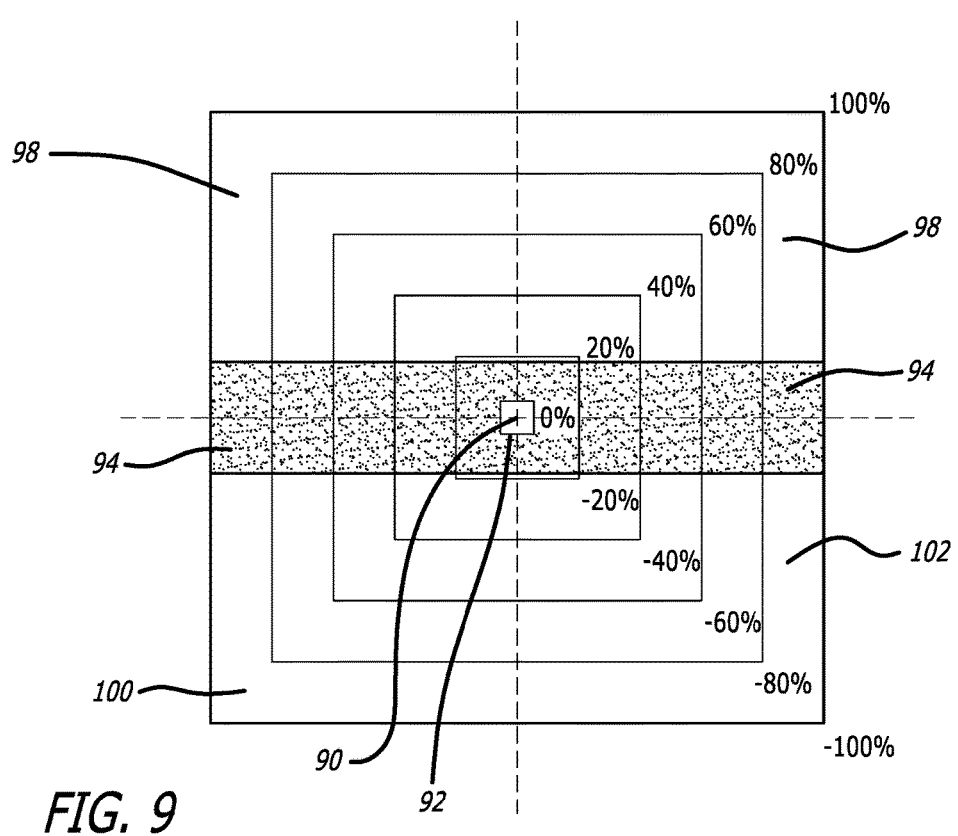
FIG. 9 is a schematic showing the logic for another embodiment of a FOB for a dual-controlled battery-powered vehicle.

Referring to FIGS. 8 and 9, schematics are provided showing an X and Y grid 88 that includes various zones or locations on the grid where the input member 60, which may be a joystick 60 or an alternate input member, can reside or where the input member 60 may be moved to by the user in one embodiment. For example purposes herein, the input member will be identified as a joystick. In one embodiment, the microcontroller 54 in the FOB 50 senses the X and Y position of the joystick 60, and the microcontroller 54 can send a signal for the X and Y position or location of the joystick 60 to the main controller 52 via the transceiver 56 on the FOB 50 and the transceiver 58 on the vehicle 10. In alternate embodiments, the microcontroller 54 can also sense acceleration of movement of the joystick 60 and provide signals associated with the acceleration of the joystick 60 to the main controller 52.

As shown in FIGS. 8 and 9, one location of the joystick 60 is the neutral position 90, which is essentially the position [0,0]. The neutral position 90 is generally the center of the X-Y grid 88 or home location for the joystick 60, indicating no movement of the joystick 60. Another location for the joystick 60 is the neutral zone 92. The neutral zone 92 is a limited area in both the X and Y directions around the neutral position 90. The neutral zone 92 allows for preventing electronic noise in the system and small inadvertent touches of the joystick from affecting whether the remote controller 50 takes any control of the vehicle 10. In one embodiment, when the joystick 60 is in the neutral zone 92 the vehicle 10 remains in full child drive mode. In one embodiment, when the joystick 60 is in the neutral zone 92 the microcontroller may send a [null,null] signal for [throttle, steer] to the main controller 52 so that the main controller 52 retains the vehicle 10 in full child drive mode.

Another location on the X-Y grid 88 of the joystick 60 is the Y-neutral zone 94. As shown in FIG. 8, the Y-neutral zone 94 comprises zones directly to the left and right of the center position 90 along the X axis of the X-Y grid. In the Y-neutral zone 94 the joystick 60 may be moved in either the positive X direction (i.e., to the right of the center location 90) or the negative X direction (i.e., to the left of the center location 90) and still remain in the Y-neutral zone 94. The Y-neutral zone 94, like the neutral zone 92, however, as shown in FIGS. 8 and 9, does allow for some slight movement in the positive and negative Y directions (i.e. up and down). In one embodiment, when the microcontroller 54 of the FOB 50 senses movement of the joystick 60 in the Y-neutral zone 94, the microcontroller 54 sends a signal for the X position of the joystick 60 to the main controller 52. As explained below, in one embodiment, when the joystick 60 is in the Y-neutral zone 94, no value for speed or throttle is sent to the main controller 52, meaning that the driver in the vehicle 10 retains control of the speed of the vehicle 10 via the accelerator 28, and a signal for the direction or steer value based off the distance of the joystick 60 along the X-axis from the center or zero position 90 (i.e., [null, X] for [throttle,steer]) is sent to the main controller 52.

Additional locations on the X-Y grid 88 of the joystick 60 are those where the joystick 60 is moved vertically, either up or down (i.e., positive Y direction or negative Y direction), out of the neutral zone 92 and Y-neutral zone 94. Four zones outside of the Y-neutral zone 94 and neutral zone 92 exist, including the forward-left zone 96, the forward-right zone 98, the reverse-left zone 100 and the reverse-right zone 102. These four zones are referred to as the full remote control zones. Accordingly, in the full remote control zones the vehicle speed as well as the vehicle direction will be fully controlled by the remote controller 50, and specifically will be based on the input received through the input member 60. In one embodiment, when the joystick 60 is positioned or moved into any of the full remote control zones 96, 98, 100 or 102, a steering signal and a throttle or speed signal is sent from the microcontroller 54 on the FOB 50 to the main controller 52. In one embodiment, the speed signal may be based on a speed value which is calculated by the microcontroller 54 based on the larger of the X and Y coordinates of the joystick location. Further, in one embodiment, the steering signal may be based on the angle of the joystick from one of the horizontal or vertical axes. In one embodiment the [throttle, steer] signal that is sent from the microcontroller 54 to the main controller 52 comprises the following when the joystick 60 is moved in the forward or upward direction (i.e., the positive Y-axis direction): [max (abs(X),Y), atan(Y,X)] so that the main controller 52 operates to move the vehicle 10 in the forward direction. Alternately, the speed of the vehicle may be based on the following algorithm, max [abs(y), abs(x)], and the direction of the vehicle may be based solely on the x value. When the joystick 60 is moved in the reverse or downward direction (i.e., the negative Y-axis direction) the signal for the throttle is opposite so that the main controller 52 operates to move the vehicle 10 in the reverse or backwards direction.

In one embodiment, as shown in FIG. 9, in parent control mode the speed of the vehicle 10 may be based on different zones of the grid. Referring to FIG. 9, if the input member 60 is positioned within a section of the grid above the X-axis that corresponds to the 20% zone, the controller 52 will cause the vehicle 10 to be propelled at 20% of the top speed; if the input member 60 is positioned within a section of the grid above the X-axis that corresponds to the 40% zone (i.e., between the 20% zone and the 60% zone), the controller 52 will cause the vehicle 10 to be propelled at 40% of the top speed; if the input member 60 is positioned within a section of the grid above the X-axis that corresponds to the 60% zone (i.e., between the 40% zone and the 80% zone), the controller 52 will cause the vehicle 10 to be propelled at 60% of the top speed; if the input member 60 is positioned within a section of the grid above the X-axis that corresponds to the 80% zone (i.e., between the 60% zone and the 100% zone), the controller 52 will cause the vehicle 10 to be propelled at 80% of the top speed; if the input member 60 is positioned within a section of the grid above the X-axis that corresponds to the 100% zone (i.e., greater than the 80% zone), the controller 52 will cause the vehicle 10 to be propelled at 100% of the top speed. If the input member 60 is positioned within a section of the grid below the X-axis it will send the appropriate negative signal based on the specific zone in which the input member 60 is positioned.

In the full child drive mode the child controls all aspects of movement of the vehicle 10, including the forward and reverse direction via the forward/reverse switch assembly 44, the forward and reverse speed via the accelerator pedal 28, and the left/right turning of the vehicle 10 via the steering wheel 24. To be in the full child drive mode, the FOB 50 must either be deactivated, such as being in the OFF mode or being retained in its storage receiver 66, or the joystick 60 of the FOB 50 must be in the neutral position 90, as explained herein with respect to FIGS. 8 and 9. Alternately, the vehicle will be in full child drive mode if the parent override switch 122 is in the off position. Additionally, the emergency stop button 62 must not have been depressed or activated.

Prior to allowing for movement of the vehicle 10, the main controller 52 determines the value for the location of the joystick 60 and the position of the emergency stop button 62 (i.e., whether it has been depressed or not). If the emergency brake button 62 has not been activated and the value for the joystick 60 location is within the neutral position 90 or neutral zone 92, the main controller 52 will allow for full child drive mode, meaning the child will have control of the speed of the vehicle 10 via the accelerator 28, the direction of the vehicle via the forward/reverse switch 44, and the child will be able to control steering of the vehicle 10 via the steering wheel 24.

If the main controller 52 receives a value from the microcontroller 54 on the FOB 50 that the joystick has moved into the Y-neutral zone 94, the main controller 52 will transition the vehicle 10 to the partial child/partial remote drive mode. When the value of the joystick location is out of the neutral zone 92 but within the Y-neutral zone 94, the main controller 52 will send a signal to the steering servo/motor 78, or to the motor controller 72 depending on the components utilized in the control system 70, so that the steering servo/motor 78 takes control of the steering capabilities of the vehicle 10 and moves the front wheels 18 based on the signal received from the FOB 50. As such, in the partial child/partial remote drive mode, when the joystick 60 is in the Y-neutral zone 94 the parent will have control of the steering of the vehicle 10 but the child will remain in control of the speed of the vehicle 10. The control of the steering system of the vehicle 10 by the remote steering may either be absolute, meaning the steering will know the exact position of the front wheels 18 and move the front wheels 18 to the exact location desired by the remote control 50, or relative, meaning that the control system will operate to turn the front wheels 18 in the direction indicated by the remote control 50. When the joystick 60 is returned to the neutral position 90, 92, control of the steering will once again be transitioned to the child in the vehicle 10 via the steering wheel 24.

If the main controller 52 receives a value from the microcontroller 54 on the FOB 50 that the joystick has moved into any of the four full remote control zones 96, 98, 100 or 102, and if the emergency brake button 62 has not been activated, the main controller 52 transitions the control system of the vehicle 10 to full remote drive mode. In full remote drive mode, like in partial remote drive mode, the main controller 52 will send a signal to the steering servo/motor 78 so that the steering servo/motor 78 takes control of the steering capabilities of the vehicle 10 and moves the front wheels 18 based on the signal received from the FOB 50. As explained above, the control of the steering system by the FOB 50 can be absolute or relative.

Additionally, in the full remote control mode the main controller 52 also controls the direction, i.e., forward/reverse, and speed of the vehicle 10 based on the signal received from the remote controller 50. If the vehicle is moving, either based on the accelerator 28 being depressed or the joystick value being a value outside the Y-neutral zone 94, the main controller 52 first determines if the joystick value is in the same direction or the opposite direction as the current movement. If the joystick value sent by the microcontroller 54 to the main controller 52 is in the opposite direction as the current movement of the vehicle 10 (e.g., the vehicle is moving forward and the joystick is pulled backward to one of the reverse locations 100 or 102), in one embodiment the main controller 52 will send a signal to the motor controller 72 to slow the vehicle 10 to a stop until the joystick 60 is moved into either the neutral zone 92 or the Y-neutral zone 94. If the vehicle 10 comes to a complete stop, the main controller 52 will lock the control system for a period of time, such as, for example, one second or two seconds, to further disable the accelerator 28. If during the lockout period the joystick is moved either into the neutral zone 92 or the Y-neutral zone 94 during the lockout period, when the lockout period expires the speed of the vehicle 10 will again be controlled by the accelerator 28 on the vehicle 10 and the vehicle 10 will speed up to the desired speed based on the force on the accelerator 28. Conversely, if after the lockout period expires the joystick 60 remains in the opposite direction the main controller 52 will send a signal to the motor controller 72 to be propelled in the opposite direction than the vehicle 10 was moving prior to the control being taken over by the remote controller 50. For example, if the vehicle 10 is moving forward and the joystick 60 is moved into one of the reverse zones 100, 102, the vehicle will first slow down to a stop or to 0% of speed, and then if the joystick 60 remains in one of the reverse zones 100, 102 the vehicle 10 will being to move in the backward direction. In one embodiment the vehicle will remain at 0% speed for a transition period, such as 1 or 2 seconds, before it begins moving in the alternate direction of the input member 60. If, however, after the vehicle comes to a stop the joystick 60 is placed in a neutral zone 92, 94, acceleration of the vehicle 10 will be transitioned to the driver of the vehicle 10 via the accelerator 28. If the vehicle 10 was not moving when the joystick 60 of the remote controller 50 was placed into one of the full remote control zones 96, 98, 100 or 102, then the main controller 52 will send a signal to the motor controller 72 to move motors 38 in the direction and speed indicated by the value of the joystick location.

Finally, if at any time the main controller 52 receives a signal from the microcontroller 54 on the FOB 50 that the emergency stop button 62 has been activated, the main controller 52 sends a signal to the motor controller 72 to stop the motors 38. In one embodiment no signal is sent to the steering servo/motor 78 because the vehicle 10 is stopped. After the vehicle comes to a stop, the accelerator 28 will be locked out for a lockout period and then control of the vehicle acceleration will depend on the location of the joystick 60 at the end of the lockout period and whether the vehicle 10 is in child control mode, partial remote control mode or full remote control mode. Further, in an alternate embodiment, the child may also have to release the accelerator 28 to exit the emergency stop mode.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the disclosed embodiments may be embodied in other specific forms without departing from the spirit or central characteristics thereof. The present examples and embodiments, therefore, are to be considered in all respects as illustrative and not restrictive, and the disclosed embodiments are not to be limited to the details given herein. Accordingly, while the specific embodiments have been illustrated and described, numerous modifications come to mind without significantly departing from the spirit of the disclosure and the scope of protection is only limited by the scope of the accompanying Claims.

What is claimed is:

1. A dual-controlled powered ride-on vehicle comprising:
   a frame supported by front wheels and rear wheels, the front wheels provided for turning the ride-on vehicle, and the rear wheels provided for propelling the ride-on vehicle;
   a steering wheel operably connected to the front wheels;
   a steering motor operably connected to the front wheels;
   a drive motor connected to at least one of the rear wheels, the drive motor operable in a forward direction and a reverse direction;
   an accelerator;
   a parent override switch;
   a main controller electrically connected to the drive motor, the steering motor, the accelerator, and the parent override switch, the main controller receiving signals from the accelerator and the parent override switch, and the main controller sending signals to the drive motor and the steering motor;
   a transceiver electrically connected to the main controller;
   a remote control having an input member, a controller and a transceiver for transmitting and receiving signals to and from the transceiver electrically connected to the main controller; and,
   wherein the main controller provides for three modes of operation of the ride-on vehicle, including a child only drive mode, a partial child and partial remote drive mode, and a full remote drive mode, and wherein the main controller switches between the three modes of operation in real time based on signals received from the remote control and the parent override switch.

2. The dual-controlled powered ride-on vehicle of claim 1, wherein when the parent override switch is in the off position the main controller operates in child only drive mode, and signals from the remote control do not control operation of the vehicle.

3. The dual-controlled powered ride-on vehicle of claim 1, wherein when the parent override switch is in the on position and the input member is providing a neutral zone signal, the controller operates the vehicle in the child only mode.

4. The dual-controlled powered ride-on vehicle of claim 1, wherein when the parent override switch is in the on position and the input member is providing a signal other than a neutral zone signal, the controller operates the vehicle in either the partial remote drive mode or the full remote drive mode depending on a signal from the input member of the remote control.

5. The dual-controlled powered ride-on vehicle of claim 4, wherein when the vehicle is in partial drive mode the accelerator controls the speed of the vehicle and the input member of the remote control controls the direction of the vehicle but not the speed.

6. The dual-controlled powered ride-on vehicle of claim 5, wherein the vehicle is in the partial drive mode when the input member is maintained within a specific distance from a Y-axis in a positive Y direction and a negative Y direction, and when the input member is transitioned a distance from an X-axis in either the positive X direction or the negative X direction.

7. The dual-controlled powered ride-on vehicle of claim 4, wherein when the vehicle is in the full remote drive mode the steering wheel does not control movement of the front wheels and the accelerator does not control movement of the rear wheels, and wherein movement of the front wheels and movement of the rear wheels is controlled by a signal from the input member of the remote control.

8. The dual-controlled powered ride-on vehicle of claim 7, wherein the vehicle is in the full remote drive mode when the input member is transitioned a sufficient distance in a positive Y direction or a negative Y direction from a Y-axis.

9. The dual-controlled powered ride-on vehicle of claim 1, wherein the remote control further has an emergency stop button, and wherein when the emergency stop button is engaged the drive motor is transitioned to stop.

10. The dual-controlled powered ride-on vehicle of claim 1, wherein the vehicle will not operate when the parent override switch is in an override setting and when the remote control is off.

11. The dual-controlled powered ride-on vehicle of claim 1, wherein the vehicle will not operate when the parent override switch is in an override setting and when the transceiver electrically connected to the main controller is not receiving a satisfactory signal from the remote control.

12. The dual-controlled powered ride-on vehicle of claim 1, further comprising a speed switch having a low speed setting and a high speed setting.

13. The dual-controlled powered ride-on vehicle of claim 12, further having a forward-reverse switch, wherein the forward-reverse switch sends a signal to the controller to set a rotation direction of the drive motor when the drive motor is controlled by the accelerator, and wherein the signal from forward-reverse switch can be overridden by a signal from the remote control.

14. The dual-controlled powered ride-on vehicle of claim 1, further comprising a signal light on the remote control to provide an indication of a strength of the signal between the transceiver in the remote control and the transceiver electrically coupled to the main controller.

15. The dual-controlled powered ride-on vehicle of claim 1, further comprising a signal light on the remote control to provide a low battery indication.

16. A dual-controlled powered ride-on vehicle comprising:
a frame supported by wheels for turning the vehicle and wheels for propelling the vehicle;
a steering wheel operably connected to the wheels for turning the vehicle;
a steering motor operably connected to the wheels for turning the vehicle;
a drive motor connected to at least one of the wheels for propelling the vehicle, the drive motor operable in a forward direction and a reverse direction;
an accelerator;
a parent override switch;
a main controller electrically connected to the drive motor, the steering motor, the accelerator, and the parent override switch, the main controller operably receiving signals from the accelerator and the parent override switch, and the main controller operably sending signals to the drive motor and the steering motor;
a remote control having an input member, a controller and a transmitter for operably transmitting signals to the main controller; and,
wherein the main controller provides for the accelerator to operably provide an input signal to the drive motor for propelling the vehicle and the steering wheel to operably control the wheels for turning the vehicle when the parent override switch is in a first position, and wherein the main controller provides for the accelerator to operably provide an input signal to the drive motor and the steering wheel to operably control the wheels for turning the vehicle when the parent override switch is in a second position and the input member of the remote control is in a neutral position.

17. The dual-controlled powered ride-on vehicle of claim 16, wherein the main controller provides for the steering wheel not to control turning of the vehicle when the parent override switch is in the second position and the input member of the remote control is maintained within a specific distance from a Y-axis in a positive Y direction and a negative Y direction, and when the input member is transitioned a distance from an X-axis in either the positive X direction or the negative X direction.

18. The dual-controlled powered ride-on vehicle of claim 16, wherein the main controller provides the accelerator not to control the drive motor and for the steering wheel not to control turning of the vehicle when the parent override switch is in the second position and the input member of the remote control is transitioned further than a set distance from a Y-axis in a positive Y direction or a set distance from the Y-axis in the negative Y direction.

19. The dual-controlled powered ride-on vehicle of claim 16, further comprising a forward-reverse switch in the vehicle, the vehicle moving in the forward direction when the forward-reverse switch is positioned in the forward position and the accelerator is depressed, and the vehicle moving in the reverse direction when the forward-reverse switch is positioned in the reverse position and the accelerator is depressed.

20. The dual-controlled powered ride-on vehicle of claim 19, wherein when the parent override switch is in the second position, the forward-reverse switch in the vehicle is in the forward position, the accelerator is depressed, and the remote control is on, when the input member of the remote control is moved a sufficient distance in the negative Y direction, the controller will cause the vehicle to slow down to zero, pause, and then then transition to the reverse direction.

21. The dual-controlled powered ride-on vehicle of claim 16, further comprising an emergency stop button on the remote control, the emergency stop button overriding the accelerator and the input member of the remote control, and causing the drive motor to transition to zero velocity when depressed.

22. A dual-controlled powered ride-on vehicle, comprising:
- a frame supported by wheels for turning the vehicle and wheels for propelling the vehicle;
- a steering wheel operably connected to the wheels for turning the vehicle;
- a steering motor operably connected to the wheels for turning the vehicle;
- a drive motor connected to at least one of the wheels for propelling the vehicle, the drive motor operable in a forward direction and a reverse direction;
- an accelerator;
- a parent override switch;
- a main controller electrically connected to the drive motor, the steering motor, the accelerator, and the parent override switch, the main controller operably receiving signals from the accelerator and the parent override switch, and the main controller operably sending signals to the drive motor and the steering motor;
- a remote control having an input member, a controller and a transmitter for operably transmitting signals to the main controller; and,
- wherein the main controller provides for the accelerator to operably provide an input signal to the drive motor for propelling the vehicle and the steering wheel to operably control the wheels for turning the vehicle when the parent override switch is in a first position, wherein when the parent override switch is in a second position and the input member is maintained within a specific distance from a Y-axis in a positive Y direction and a negative Y direction, and wherein the input member is transitioned a distance from an X-axis in either the positive X direction or the negative X direction, the accelerator will control the speed of the vehicle and the input member of the remote control will control steering of the vehicle.

23. The dual-controlled powered ride-on vehicle of claim 22, wherein when the input member is transitioned a sufficient distance in a positive Y direction or a negative Y direction from a Y-axis the input member will control the drive motor.

* * * * *